May 29, 1928.

Re. 16,977

S. ANTHONY

STAMPING MACHINE

Original Filed Aug. 18, 1926

Inventor.
Stanley Anthony
by Howard Smith & Tennant.
Attys.

Reissued May 29, 1928. Re. 16,977

UNITED STATES PATENT OFFICE.

STANLEY ANTHONY, OF BOSTON, MASSACHUSETTS.

STAMPING MACHINE.

Original No. 1,649,438, dated November 15, 1927, Serial No. 129,938, filed August 18, 1926. Application for reissue filed March 2, 1928. Serial No. 258,625.

This invention relates to stamping machines and particularly to stamping machines which are designed to print on a salesbook or sales slip the name and address of a customer.

In the merchandizing operations of retail stores it is a common practice for the salesman to make out a sales slip for each purchase and where the goods are to be sent to the customer or if the customer has a charge account the name and address of the customer is written on the slip by the salesman. These sales slips are usually in the form of pads which are retained in a salesbook and it is a common practice to have carbon copies made to furnish duplicates or triplicates, one of which copies usually goes with the goods and furnishes the address to which the goods are to be delivered. These sales slips are frequently made out in considerable haste and the name and address is not always clearly legible. As a result there is failure of delivery of many packages sent out from the store because of the illegibility of the name or address.

It is one of the objects of my present invention to provide a novel stamping machine by which the name and address of the customer, as well as any other desired data, such as the number of the customer's charge account, might be stamped or imprinted on the sales slip in clear legible type. With this object in view the invention consists of various features which will be more fully hereinafter described and then pointed out in the appended claims.

In the drawings, Fig. 1 is a perspective view of a stamping machine embodying my invention;

In many retail stores each salesman has a salesbook which is constructed to contain two or more pads of sales slips. The sales slip of one pad, for instance, would be used for charge customers, those of another pad for goods sent C. O. D., and those of another pad for cash sales. On the sales slip made out when goods are charged or when they are to be sent C. O. D. it is necessary for the salesman to write on the slip the name and address of the customer.

Figure 1:
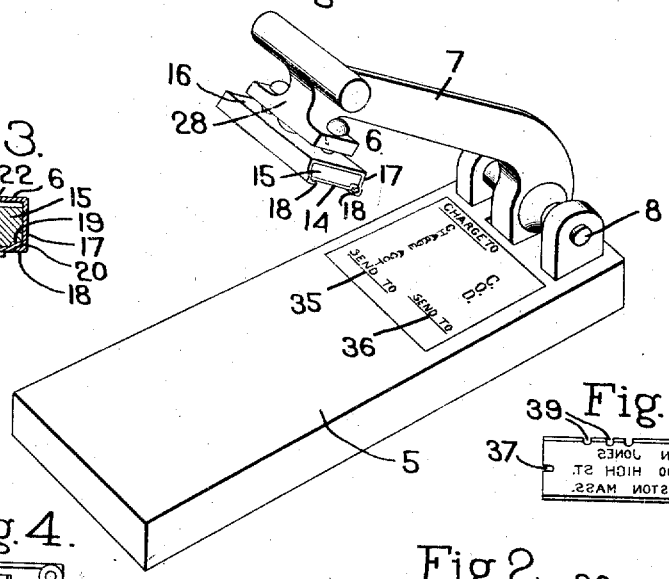
Figure 3:
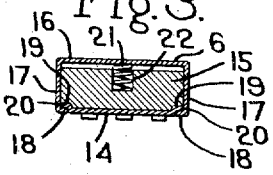
Fig. 3 is a section on the line 3—3, Fig. 2.
Figure 7:
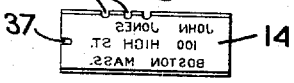
Fig. 7 illustrates the type plate.
Figure 4:
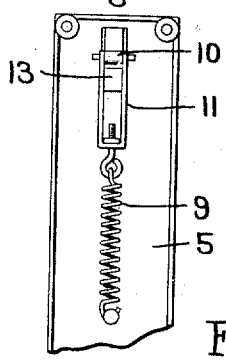
Fig. 4 is a fragmentary under side view.
Figure 2:
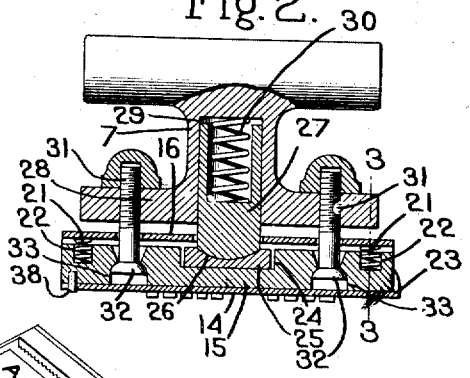
Fig. 2 is an enlarged sectional view through the printing head.
Figure 5:
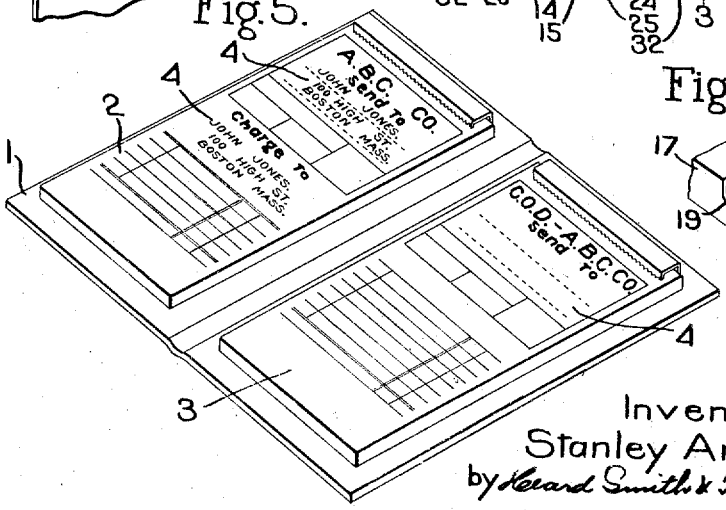
Fig. 5 is a view illustrating a salesbook which may be used in connection with the device.
Figure 6:
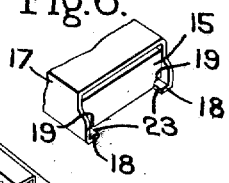
Fig. 6 is a fragmentary perspective view.

Fig. 5 of the drawings illustrates a sales book 1 having two pads of sales slips 2 and 3 therein, the pad 2 being for charge slips, 3 being the slips used for a C. O. D. purchase. Each slip has a space 4 thereon to receive the name and address of the customer.

The stamping machine herein shown, which is for the purpose of stamping the name and address of the customer in the space 4, comprises a bed 5 on which the salesbook may be placed during the stamping operation and a printing head 6 adapted to carry an interchangeable type plate mounted for movement toward and from the bed. This printing head is shown as carried by a swinging arm 7 pivotally mounted on the bed at 8. Said arm is acted on by a spring 9 which yieldingly holds it in raised position for which purpose the arm is extended below its pivot as shown at 10 and is connected by a link member 11 to a pulling spring 9, the action of the spring operating to hold the arm yieldingly in elevated position.

13 is a stop which limits the elevating movement of the arm.

The printing head is provided with a type plate receiving surface adapted to receive an interchangeable type plate such as shown at 14, said type plate having formed or embossed thereon type characters constituting the data which it is desired to print. Said printing head is also illustrated as a self-adjusting one so that it will automatically accommodate itself to the surface on which the impression is to be made.

In the illustrated embodiment of the invention the type plate receiving surface of the head is shown as being constituted by the lower face of a block 15 and the type plate is held against said face by yielding arms or members 17. The type plate receiving surface is formed with grooves 19 herein shown as rabbets at the side edges of the block 15 and the type plates 14 have their edges offset as shown at 20, said offset edges being received in the rabbets 19 and being engaged by the lips 18 formed on the ends of the arms 17. With this construction the type characters of the type plates are entirely below the retaining lips 18 so that when the impression is made the lips will not engage the paper.

The holding member 16 is acted on by springs 21 which are received in recesses 22 in the block 15, said springs causing the lips 18 to yieldingly engage the offset edges 20 of the type plate. The type plates can be readily slipped into place from one end and to facilitate this the sides 17 of the holding member are projected slightly beyond the block at one end as indicated at 23 so that at this end the lips 18 also extend beyond the blocks. To insert a type plate in place one end of the type plate is placed against the projecting ends of the lips 18 and pressed downwardly so as to separate said lips from the rabbets 19 sufficiently to permit the plate to enter and then the plate may be slipped into place.

The printing head 6 is a self-adjusting head so that it will readily accommodate itself to the surface on which the impression is to be made in case said surface is not exactly parallel to the top surface of the bed 5. In the construction shown this is accomplished by forming the block 15 with a recess 24 in which is loosely received a bearing block 25, the latter having a concave socket 26 which has bearing against the convex end of a post 27 that is yieldingly mounted in the end 28 of the arm 7. This post enters a recess 29 in the arm and is backed by a spring 30.

31 indicate retaining screws which extend through the block and screw into the end 28 of the arm 7, the heads 32 of the screws being received in recesses 33 in the block 15. The apertures through which the screws extend are slightly larger than the screws so as to allow the block to have a certain latitude of movement relative to the head. With this construction the block 15 is permitted a limited rocking movement on the rounded end of the post 27 both in a transverse and a longitudinal direction. The post 27 also has a yielding movement relative to the arm 7 due to the action of the spring 30, the amount of the yielding movement being limited by the screws 31.

It will be noted that the rounding surface 26 on which the block 15 rocks is situated below the upper face of said block and relatively close to the face carrying the printing type. This arrangement by which the axis about which the plate 15 turns is relatively close to the printing face has the advantage that any turning movement of the plate necessary to bring the type into parallelism with the surface on which the impression is to be made is accomplished without any appreciable lateral movement and thus a clear impression is produced.

In using the device each customer is supposed to have in his possession a type plate bearing his name and address and when he makes a purchase he will hand the type plate with his name on it to the salesman and the latter will place the type plate in the printing head and by means of this will print the customer's name and address on the sales slip. The printing may conveniently be done through the medium of carbon paper, suitable sheets of carbon paper being placed between the duplicate or triplicate slips and another carbon paper being placed on top of the top slip. When the salesbook 1 is properly placed on the bed so as to bring the space 4 into printing position a quick downward movement of the arm 7 will cause a printed impression to be made through the carbon paper on the top sheet of the slip and duplicate carbon copies on the duplicate slips.

This operation of introducing the type plate into the machine, placing the salesbook in position on the bed and giving the arm a quick downward stroke can be performed as quickly, if not more quickly, than the name and address of the customer can be written in by hand so that the use of the machine does not in any way delay the transaction. Furthermore, by having the name and address printed on the sales slip the name and address will be easily read thus obviating the possibility of mistakes through illegible writing.

In many salesbooks the space for receiving the customer's name is in a different location on the charge slip from what it is on the C. O. D. slip or some other slip and sometimes a sales slip may have two spaces for the customer's name, especially if the sales slip is a two part one which is to be divided. In order to ensure that the printed impression will always be made in the right position on the sales slip I have provided the bed herein with a series of guide lines by which the salesbook may be positioned on the bed to receive the printed impression. For instance, in the sample sales slip shown for the charge account there are two spaces for the entry of the name of the customer, one under the designation "Charge to" and the other under the designation "Send to." The bed 5 is herein shown as provided with two guide lines 34, 35 which are for the purpose of assisting in positioning the book for entries on the charge slips. The guide line 34 is so positioned that when the top edge of the salesbook is placed on said line the charge sales slip will be properly positioned to receive the printed impression at the space entitled "Charge to" while when the salesbook is shifted so that the top edge thereof is on the guide line 35 the charge sales slip will be properly positioned to receive the printed impression in the space entitled "Send to." For convenience these two guide lines 34, 35 may be indicated by the title "Charge acct." The C. O. D. slips shown have provision for entering the name once only and the bed under the designation "C. O. D." will have a guide line 36 which is designated "Send to" and which is situated so that when the top edge of the salesbook 1 is positioned by this guide line the space 4 on the C. O. D. slip will be in position to receive the imprint. The bed may have other guide lines which will fit other forms of sales slips if such are used.

The self-adjusting head provides for making a clear cut impression regardless of the thickness of the pad or of any irregularities in the surface on which the impression is to be made. If when the arm 7 is moved downwardly to make a printed impression the printing block is not square with the surface of the paper said block will upon contact with the paper immediately rock slightly on the rounded end of the post 27 until the type plate is parallel to the printed surface. The head will thus automatically adjust itself into proper position. This automatic adjustment will occur the instant that the type plate strikes the surface and as the arm 7 will naturally be moved downwardly with a quick motion and the force of the downward movement will cause the spring 30 to be compressed thus allowing the end of the post 27 to strike the end of the recess 29. This will produce the effect of a blow which will cause the type characters to make their impression through the carbon paper. The blow effect, however, does not occur until immediately after the head has automatically adjusted itself into parallel arrangement with the printing surface. With this self-adjusting printing head, therefore, the printing head or type plate will be automatically adjusted into parallelism with the surface on which the imprint is to be made as soon as the head strikes the paper and before the blow is struck which causes the printing impression to be made, these two operations occurring in sequence, although, of course, in very rapid succession.

When the block 15 is rocked or tilted to bring the type plate into parallelism with the surface on which the impression is to be made, the rocking movement of said block will occur about the heads 32 of the screws 31. These heads are located slightly below the rounded end 26 of the post 27 and in order that there may be no binding of the parts and that the rocking action may be free I have made the recess 24 in which the bearing block 25 is received slightly larger than said block so that said block can slide or move laterally in the recess during the rocking of the member 15.

In order to guard against the use in one store of a type plate which belongs to another store I propose to construct the type plates for any particular store so that they will not fit the machines used in another store. As herein shown each type plate is formed at one end with a notch or recess 37 and the block 15 is formed with a pin or projection 38 situated to fit into the notch when the type plate is inserted into the machine. Some other store would have the notch 37 in another location on the type plate with the pin, of course, in a corresponding position and hence the type plate intended for use in one store cannot be properly positioned in the machine used in some other store. Furthermore, the type plates for any other store may have some identifying marks thereon as for instance a certain number of notchs 39 cut into the edge, the number of such identifying notches for each store being different.

I claim:

1. In a stamping machine, the combination with a bed, of an arm pivoted thereto, a post having a rounded end carried by said arm, a printing head comprising a block, means for detachably securing a type plate to said block, a bearing plate loosely carried by the block and having a concave socket in which the rounded end of the post has bearing, and means connecting said block to said arm to permit the block to rock in either direction.

2. In a stamping machine, the combination with a bed, of an arm pivoted thereto, a post having a rounded end yieldingly carried by said arm, a printing head comprising a block, means for detachably securing a type plate to said block, a bearing plate loosely carried by the block and having a concave socket in which the rounded end of the post has bearing, and means connecting said block to said arm to permit the block to rock in either direction.

3. In a stamping machine, the combination with a bed, of an arm pivoted thereto, a self-adjusting printing head carried by said arm, said printing head comprising a block having its side edges rabbeted, a type plate resting against the block, the edges of the type plate being offset and occupying the rabbeted portion of the block, and a holding member yieldingly supported by the block and having retaining lips which engage the offset portions of the type plate.

4. In a stamping machine, the combination with a bed, of an arm pivotally mounted thereon, a printing head carried by the arm and comprising a block, a type plate resting against the block, a retaining member yieldingly supported by the block and having at its edges lips to underlie the edges of the type plate and hold it yieldingly against the block, said lips being extended beyond the ends of the block, whereby when the type plate is to be inserted one end thereof may be placed against the projecting ends of the lips and by pressure thereon the lips may be separated sufficiently to permit the plate to be slipped into place.

5. In a stamping machine, the combination with a bed, of an arm pivotally mounted thereon, a head carried by the arm and movable toward and from the bed as the arm swings, an interchangeable type plate removably carried by the head and slidable thereon into position, said head having a stop projection and the type plate having a corresponding recess to receive said projection when the plate is in proper position.

6. In a stamping machine, the combination with a bed, of an arm pivotally mounted thereon, a head carried by the arm and comprising a block, a type plate resting against the block, and a retaining member supported by the block and having at its edges lips to underlie the edges of the type plate and hold it against the block, said lips being extended beyond the end of the block, whereby when a type plate is to be inserted one end thereof may be placed against the projecting ends of the lips and said plate may be guided into position by the lips.

7. In a stamping machine, the combination with a bed, of an arm pivoted thereto, a printing head carried by said arm, said printing head comprising a block having two longitudinal grooves, a type plate resting against the block, the edges of the type plate being offset and occupying the grooves, and a holding member yieldingly supported by the block and having retaining lips which engage the offset portions of the type plate.

8. In a stamping machine, the combination with a bed, of an arm pivoted thereto, a printing head carried by the arm and comprising a block, a type plate resting against the block, yieldable retaining arms at the sides of the block provided with lips to engage the edges of the type plate and hold it yieldingly against the block, and guiding lips extending beyond the end of the block, said lips serving to position a type plate which has one end placed thereon so that said type plate may be slid into operative position between the retaining arms.

9. In a stamping machine, the combination with a bed, of an arm pivoted thereto, a printing head carried by said arm, said printing head comprising a block having two longitudinal grooves, a type plate resting against the block, the edges of the plate being received in the grooves, and yieldable retaining arms at the sides of the block to engage the edges of the type plate and hold it yieldingly against the block.

10. In a stamping machine, the combination with a bed, of an arm pivoted thereto, a printing head carried by said arm, said printing head having a type plate receiving portion provided with two longitudinal grooves, a type plate resting against said portion, the edges of the plate being received in the grooves, and yieldable retaining arms at the sides of said portion to engage the edges of the type plate and hold it yieldingly in place.

In testimony whereof I have signed my name to this specification.

STANLEY ANTHONY.